United States Patent Office 3,328,445
Patented June 27, 1967

3,328,445
THIOUREA HEXAFLUORO ARSENATES AND PHOSPHATES
Hugh T. Harrison, Tulsa, Okla., assignor to The Dow Chemical Company, Midland, Mich., a corporation of Delaware
No Drawing. Filed Jan. 27, 1964, Ser. No. 340,558
3 Claims. (Cl. 260—440)

The present application is directed to novel thiourea compounds and is directed, in particular, to the compounds of the formula

In the above and succeeding formulae, R represents a member selected from the group consisting of arsenic and phosphorus.

The present compounds are solid materials, of moderate solubility in water and of low to moderate solubility in organic solvents. They are useful as parasiticides and are adapted to be employed for the control of insect, arachnid, bacterial, and fungal pests.

The novel compounds are prepared by reacting hexafluoroarsenic acid or hexafluorophosphoric acid and thiourea. Thiourea has the formula

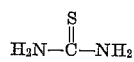

Conveniently, the reaction is carried out in an inert liquid reaction medium, such as water. Some of the desired product is obtained when employing the reactants in any amounts. However, the reaction consumes the reactant in amounts which represent equimolecular proportions and good results are obtained when substantially equimolecular proportions of the reactants are employed or when the hexafluoroarsenic acid or hexafluorophosphoric acid is employed in an amount in excess of that which is equimolecular with the amount of thiourea employed. The reaction is exothermic and takes place smoothly at temperatures of from 20° to 100° C.

In carrying out the reaction, the hexafluoroarsenic acid or hexafluorophosphoric acid is contacted with thiourea in any conventional manner. Conveniently, the contacting is carried out by adding one reactant to the other. Oftentimes it is convenient to employ the hydrate form of the acid. The temperature of the resulting reaction medium can be controlled by regulating the rate of the contacting of the reactants as well as by external heat exchange. Sometimes the desired product precipitates in the mixture during the reaction. If desirable to maintain fluid condition, such product can be separated in part from fluid portions of the mixture by conventional procedures. Upon completion of the contacting of the reactants, most of the reaction will have taken place with the production of the desired product. Where optimum yields are desired, it is often convenient that the reaction mixture be allowed to stand several hours or longer under reaction conditions to insure substantial completion of reaction.

Upon completion of the reaction, the solvent can be removed from the reaction mixture by evaporation or distillation under reduced pressure to obtain the product as a residue. Such product residue can be further purified by conventional procedures, such as, for example, washing with water or suitable organic liquid, or recrystallization.

EXAMPLE 1

*Thiourea hexafluoroarsenate*

15 grams of thiourea (about 0.2 mole) were dispersed in 100 milliliters of hot distilled water. The resulting hot aqueous dispersion was added in one portion to 50 grams of hexafluoroarsenic acid monohydrate (0.24 mole). The resulting solution was cooled for a period of about 30 minutes in an ice bath, and the cooled solution filtered to separate a white crystalline material. This material was washed 3 times, each time with a 50 milliliter portion of diethyl ether, and the washed material dried by evaporation under subatmospheric pressure. The dried material was found to melt at about the melting point of thiourea, and the material assumed to be unreacted starting material.

Thereafter, the original reaction mixture was cooled further with solid carbon dioxide over a period of about thirty minutes, during which period the thiourea hexafluoroarsenate product precipitated in the reaction mixture. The product precipitate was separated from the reaction mixture by filtration, and the filtered product dried by evaporation under subatmospheric pressure. The dried product was found to melt at 168–171° C., with decomposition.

In a similar manner, thiourea hexafluorophosphate (melting, with decomposition, at 165–170° C.) was prepared by reacting together thiourea and hexafluorophosphoric acid.

When the present compounds are employed as parasiticides, the unmodified compounds can be used. However, the present invention also encompasses the use of one or both of the compounds together with a parasiticide adjuvant. In such use, the compounds can be dispersed upon a finely divided solid and the resulting preparation employed as a dust. Also, such mixture can be dispersed in the water with the aid of a wetting agent and the resulting aqueous suspension employed as a spray. In other procedures, the products can be employed as constituents of organic liquid compositions, oil-in-water or water-in-oil emulsions, or water dispersions with or without the addition of wetting, dispersing, or emulsifying agents.

In representative operations, thiourea hexafluoroarsenate was employed to prepare an aqueous dispersion containing 500 parts of the compound, as sole active toxicant, per million parts by weight of ultimate dispersion. A stand of young cranberry bean plants was thoroughly wetted briefly with the dispersion, the wetted plants permitted to dry, and 5 live southern army worm larvae placed on each plant of the stand. In identical operations, 5 live southern army worm larvae were placed on each plant in a control stand of untreated young cranberry bean plants. Each of the stands was maintained for a period of about 6 days under conditions favorable to the growth of the larvae. At the end of the 6-day period, all of the plants were examined; in the treated stand, there was found a 100 percent kill and control of southern army worms, while a thriving population of live southern army worm larvae continued to feed on the plants of the control stand.

I claim:
1. Compound of the formula

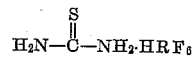

wherein R represents a member selected from the group consisting of arsenic and phosphorus.
2. Thiourea hexafluoroarsenate.
3. Thiourea hexafluorophosphate.

No references cited.

TOBIAS E. LEVOW, *Primary Examiner.*
W. F. W. BELLAMY, *Assistant Examiner.*